(12) United States Patent
Lewis

(10) Patent No.: US 11,819,036 B1
(45) Date of Patent: Nov. 21, 2023

(54) POULTRY MEAT PRODUCT

(71) Applicant: Donald Gene Lewis, Terlton, OK (US)

(72) Inventor: Donald Gene Lewis, Terlton, OK (US)

(*) Notice: Subject to any disclaimer, the term of this patent is extended or adjusted under 35 U.S.C. 154(b) by 105 days.

(21) Appl. No.: 17/559,787

(22) Filed: Dec. 22, 2021

Related U.S. Application Data

(60) Provisional application No. 63/166,510, filed on Mar. 26, 2021, provisional application No. 63/130,155, filed on Dec. 23, 2020.

(51) Int. Cl.
 *A22C 21/00* (2006.01)
(52) U.S. Cl.
 CPC ........ *A22C 21/003* (2013.01); *A22C 21/0069* (2013.01)
(58) Field of Classification Search
 CPC .......................... A22C 21/003; A22C 21/0069
 USPC ....................................................... 452/135
 See application file for complete search history.

(56) References Cited

U.S. PATENT DOCUMENTS

| | | | | |
|---|---|---|---|---|
| 5,314,374 A | * | 5/1994 | Koch | A22C 21/003 452/136 |
| 2011/0045756 A1 | * | 2/2011 | De Vos | A22C 21/0069 452/136 |
| 2013/0280998 A1 | * | 10/2013 | Hahn | A22C 21/003 452/136 |

* cited by examiner

*Primary Examiner* — Richard T Price, Jr.
(74) *Attorney, Agent, or Firm* — James F. Lea, III; Gable Gotwals

(57) ABSTRACT

A poultry meat product and method of producing the same. The meat product has breast meat divisible into a first portion attached to a wishbone and separated from a second portion. The first portion remains attached to the wishbone and has a width having a dimension of between 1.0 and 1.5 times a first distance between tips of the wishbone and having a length having a dimension of between 0.5 and 1.5 times a length of the wishbone. A shaped blade may be inserted into a bird carcass for cutting the breast fillets. A V-shaped cut has a first segment approximately parallel to a first wishbone leg and a second segment approximately parallel to a second wishbone leg. The cut defines a portion of the breast fillets that remain attached to the wishbone. The wishbone remains intact within the attached portion of breast fillet for producing a unique meat product.

22 Claims, 8 Drawing Sheets

POULTRY MEAT PRODUCT

CROSS REFERENCE TO RELATED APPLICATIONS

This application claims the priority of U.S. Provisional Patent Application No. 63/130,155 titled "WISHBONE BREAST STRIPS," filed Dec. 23, 2020, and U.S. Provisional Patent Application No. 63/166,510 titled "WISHBONE BREAST STRIPS," filed Mar. 26, 2021, the contents of both of which are hereby incorporated by reference.

FIELD OF THE INVENTION

This invention relates to a method or process of portioning slaughtered poultry carcasses to create a skinless breast portion that includes the furcula bone and a part of its associated muscles or meat. This invention relates to a poultry meat product and method of producing a poultry meat product wherein breast meat is cut in a certain way such that a pre-determined amount of meat is left on the wishbone.

BACKGROUND OF THE INVENTION

The term, "wishbone" commonly refers to the furcula, i.e., two collarbones or clavicles that are fused into a V-shape structure. The furcula is attached to the breast muscles in birds and poultry of all kinds. See furcula 10 shown in FIGS. 1 and 2.

Still referring to FIGS. 1 and 2, in birds, furcula 10 works as a strut between a bird's sternum or keel 12 and shoulders 14. In conjunction with coracoid 15 and scapula 16, furcula 10 forms a unique structure called "the shoulder girdle" that acts as a scaffolding for a strong tendon that connects the inner breast muscles (i.e., supracoracoideus muscle or tenders) to the proximal side of wing bone humerus 17. This system is responsible for lifting the wings during the contraction of the inner breast muscles. During flight, furcula 10 works like an elastic spring, opening wide during a downstroke and then returning to the resting position.

The wishbone has many cultural and ceremonial meanings around the world. In medieval Europe, a goose wishbone was used in foretelling of the weather following the harvest celebration called the Feast of St. Martin.

Ancient Romans were the first to identify the wishbone as a symbol of luck, which eventually turned into the tradition of actually breaking it apart. The wishbone tradition eventually spread to the English colonies in North America. A wishbone would be snapped apart by two people while they were each making a wish. The person who ends up with the larger piece of the broken bone will have their wish granted. If the bone broke evenly in half, both would have their wishes come true.

Demand for poultry and poultry meat products has expanded to globally, such that poultry has become the leading animal protein source. After slaughter, domestic poultry carcasses are typically cut into various sections, including breast, wings, thighs and drumsticks. These sections can also be further portioned into various skinless and boneless products for retail based on customer specifications.

Breast muscles of poultry, comprised of outer "fillets" and inner "tenders", are extremely popular in myriad of food-service products. Because these muscles have the highest economic value, processors are extremely interested in their marketable yield (i.e., proportion to carcass weight) during the meat extraction (deboning) process following chilling. Conventional manual (cone-line) and automatic deboning techniques employed today have evolved to maximize the amount of breast meat removed by leaving very little adhering meat on the skeletal frame, i.e., rib cage 18, keel 12 and shoulder bones, including wishbone 10. Since stripping of wishbone 10 from adhering breast muscles is especially critical in assuring maximal boneless breast meat yields, most yield control checks involve examination of residual meat left on wishbone 10. Some amount of breast meat inevitably adheres to wishbone 10 and is considered "yield giveaways." Typically, a whole bird is 40% bone to 60% meat. On a typical exit clamp out wishbone process, 25 g to 50 g of meat may remain on the bone, although hand cuts can remove all meat.

SUMMARY OF THE INVENTION

This invention relates to a poultry meat product and a method or system of preparing a poultry mean product including a wishbone cut having skinless breast meat attached to produce the new commercial poultry meat product. This new poultry meat product could allow a new generation of consumers to enjoy a prime cut of poultry breast meat while carrying on the tradition of making a wish with the wishbone following the meal.

The present invention provides a method for producing a new and novel poultry meat product for the consumers, while increasing the potential for additional salable yield and, hence, added profit for poultry processors. The wishbone with meat poultry meat product has the potential to attract new customers, expand markets and enhance the consumption of poultry meat.

In greater detail, a method of the invention for producing a poultry meat product includes placing a skinless front-half of a bird carcasses for further processing. The front-half of a poultry carcass is defined herein as a pair of breast fillets including a wishbone, a pair of tenders, as well as the associated skeletal frame, including the ribcage and thoracic vertebrae.

In one aspect of the invention, a method of producing a poultry meat product includes the steps of positioning a skinless front-half of a bird carcass, the bird carcass defining a proximal end and having a pair of breast fillets, a pair of tenders, and a wishbone, the wishbone having a first leg and a second leg, the bird carcass having leg quarters and wings removed at the shoulder joint to loosen attachments.

In one embodiment, a shaped blade is inserted into the bird carcass for making a shaped cut for cutting the breast fillets at the proximal end of the bird carcass. The shaped blade may be V-shaped for making a V-shaped cut having a first segment approximately parallel to the first leg of the wishbone and a second segment approximately parallel to the second leg of the wishbone, the V-shaped cut defining an attached portion of the breast fillets that remain attached to the wishbone, wherein the wishbone remains intact. In another embodiment, the shaped blade may be cylindrical for removing a cylindrical plug of breast meat containing the wishbone.

The wishbone with the attached portion of the breast fillets are separated from the rest of the breast fillets for preparing a wishbone breast strip. In embodiments of the invention, the attached portion of the breast fillets comprises between 5% and 40% by weight of the pair of breast fillets, between 10% and 30% by weight of the pair of breast fillets, and between 15% and 25% by weight of the pair of breast fillets.

In other embodiments of the invention, tips of the wishbone are spaced a first distance apart and the attached portion of the breast fillets have a width having a dimension of between 1.0 and 1.5 times the first distance between the wishbone tips, or between 1 and 1.25 times the first distance between the wishbone tips.

In other embodiments of the invention, the wishbone having a length defined by a distance between a joined end and a mid-point between the tips of the wishbone and a length of the attached portion of the breast fillets has a dimension of between 0.5 and 1.5 times the length of the wishbone, or of between 0.75 and 1.25 times the length of the wishbone, or of between 0.9 and 1.1 times the length of the wishbone.

In another aspect of the invention, a poultry meat product is produced from a poultry carcass having breast meat divisible into a first portion attached to a wishbone and a second portion separated from the wishbone, the poultry meat product having the first portion of the breast meat separated from the second portion of the breast meat, wherein the wishbone that is attached to the first portion of the breast meat remains intact, and wherein the first portion of the breast meat comprises between 3% and 50% by weight of the breast meat. In other embodiments, the first portion of the breast meat is between 5% and 40% by weight of the breast meat, between 10% and 30% by weight of the breast meat, or between 15% and 25% by weight of the breast meat.

In another aspect of the invention, a poultry meat product is derived from a poultry carcass having breast meat and a wishbone, wherein the wishbone has a split end defining tips and a joined end, the tips spaced a first distance apart, and a distance between the joined end and a mid-point between the tips defining a length. The poultry meat product includes a first portion of the breast meat separated from a second portion of the breast meat, wherein the first portion remains attached to the wishbone, and wherein the first portion of the breast meat has a width and a length, the width having a dimension of between 1.0 and 1.5 times the first distance between the wishbone tips. In one embodiment, the width of the breast meat has a dimension of between 1 and 1.25 times the first distance between the wishbone tips. In some embodiments, the length of the first portion of the breast meat has a dimension of between 0.5 and 1.5 times the length of the wishbone, between 0.75 and 1.25 times the length of the wishbone, between 0.9 and 1.1 times the length of the wishbone. In some embodiments, the first portion of the breast meat comprises between 5% and 40% by weight of the breast meat or between 10% and 30% by weight of the breast meat.

DETAILED DESCRIPTION OF THE PREFERRED EMBODIMENTS

As conventionally known and practiced, wishbones are carefully removed from deboned poultry breast meat to maximize boneless breast meat yields. Equally well understood and operationally emphasized is that boneless meat products must be devoid of all bone and bone fragments to assure food safety, i.e., freedom for physical hazards.

Figure 1:
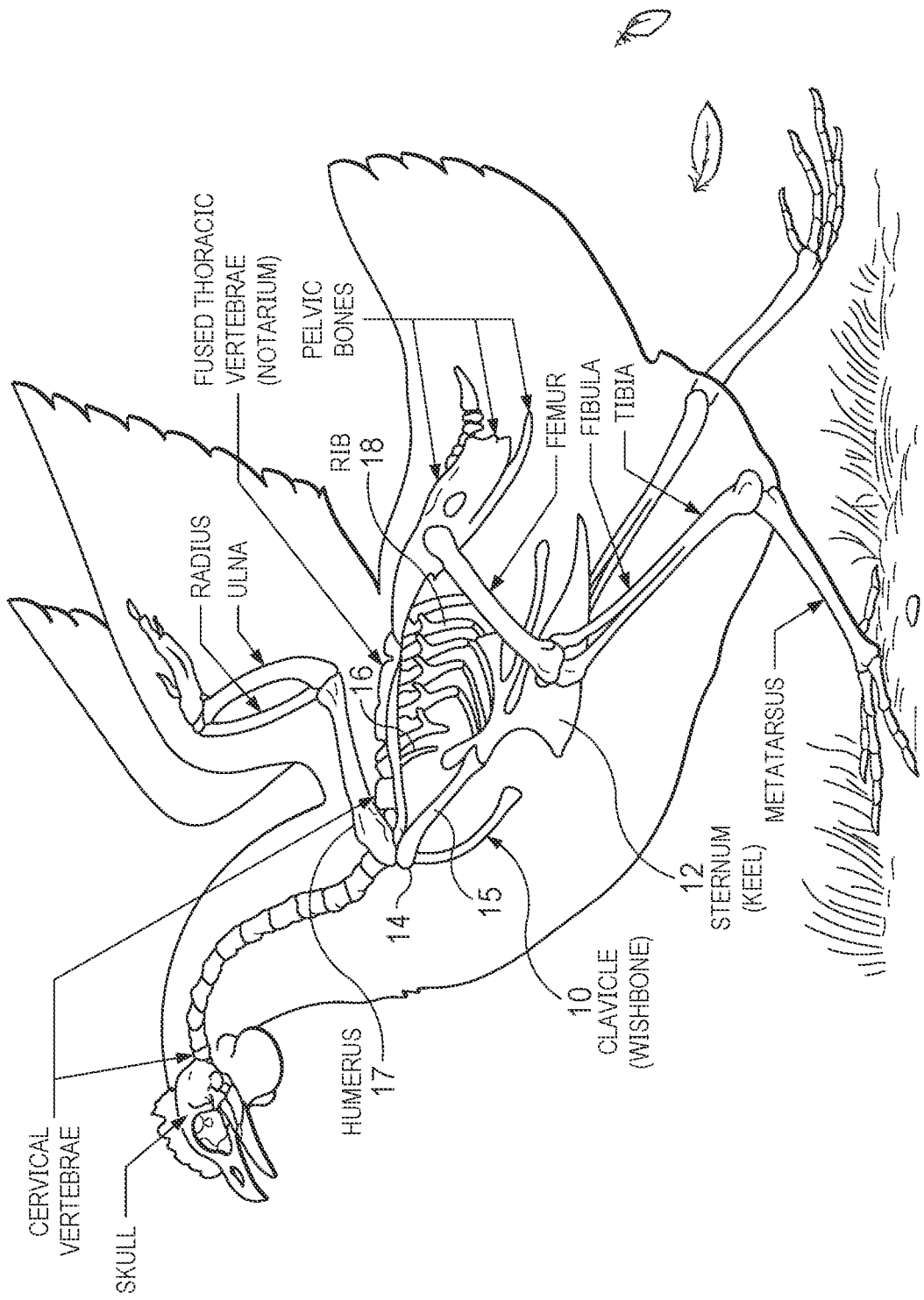
FIG. 1 is a schematic of bird anatomy, including the furcula or wishbone.
Figure 2:
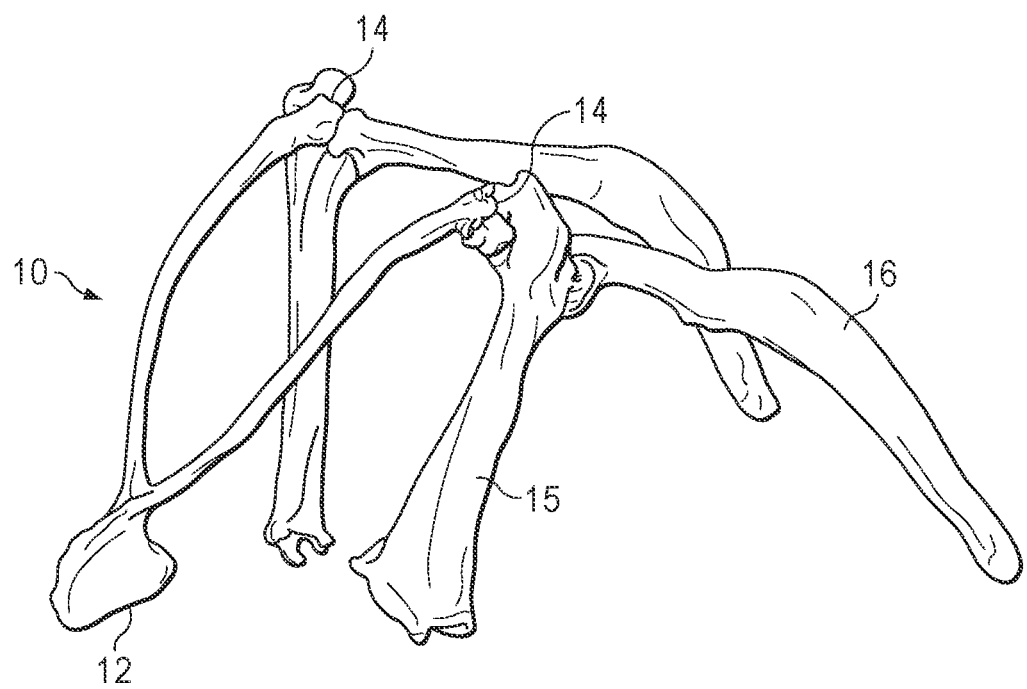
FIG. 2 is an enlarged view of the shoulder girdle of poultry carcasses, including the wishbone and attachment locations.
Figure 3:
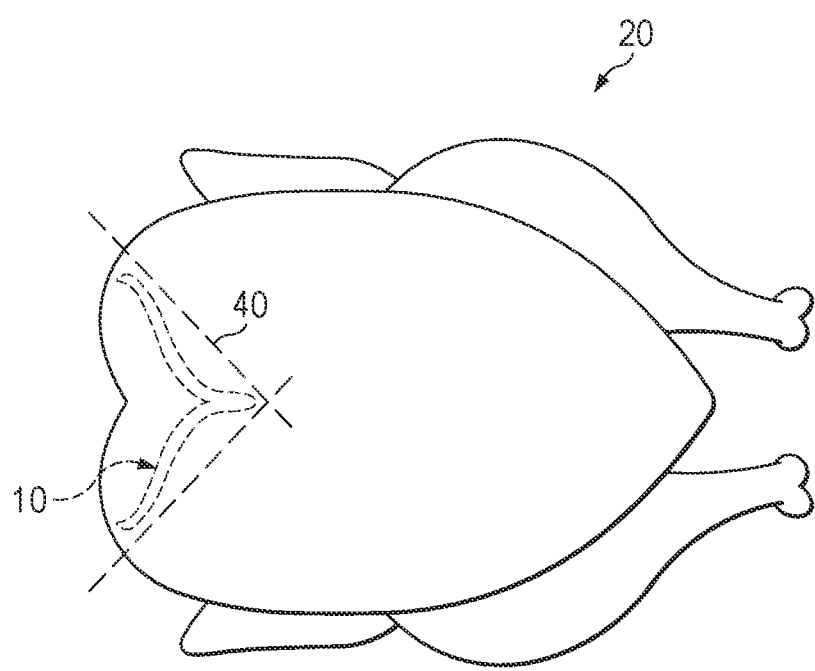
FIG. 3 shows a schematic view of the location of the wishbone on a poultry carcass in a top view.
Figure 5C:
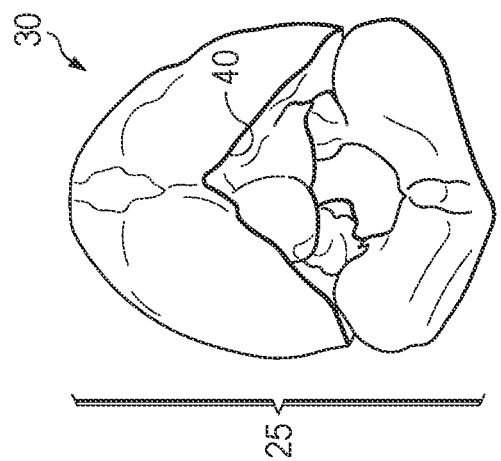
FIG. 5C is a plan view of the chicken carcass of FIG. 4 showing a v-shaped cut for cutting the breast fillets at a proximal end of the breast fillets, wherein the wishbone is separated from the shoulder on both sides.
Figure 5B:
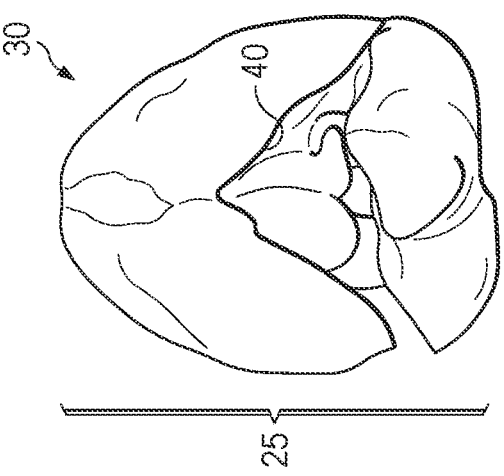
FIG. 5B is a plan view of the chicken carcass of FIG. 4 showing a v-shaped cut for cutting the breast fillets at a proximal end of the breast fillets, wherein attachment of the wishbone to the keel is severed.
Figure 5A:
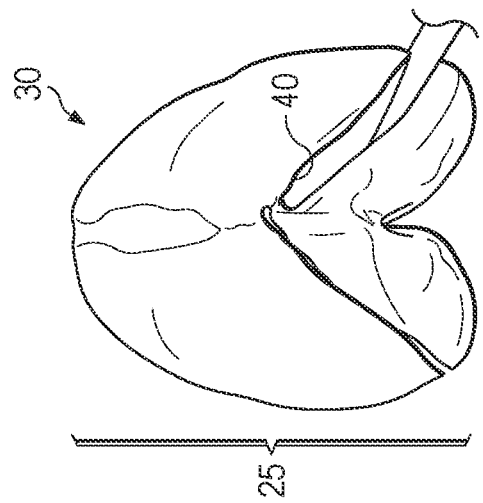
FIG. 5A is a plan view of the chicken carcass of FIG. 4 showing a v-shaped cut for cutting the breast fillets at a proximal end of the breast fillets, wherein the cuts are made parallel to the legs of the wishbone on both sides.
Figure 6C:
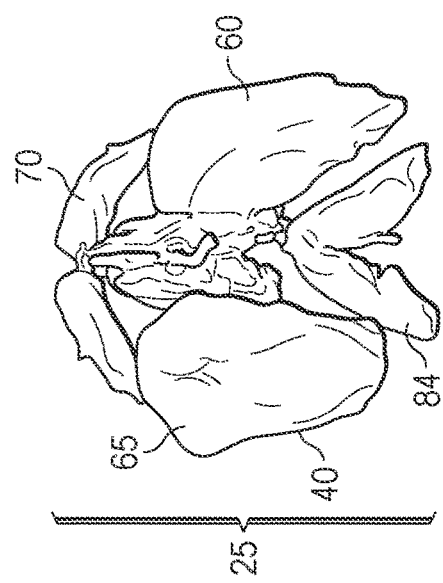
FIG. 6C is a plan view of the chicken carcass of FIG. 4 that shows a poultry meat product or wishbone breast strip, breast fillets, tenders, and the residual skeletal frame.

In one embodiment, breast meat 25 (see, e.g., FIG. 4) is separated for making breast meat fillets 60 (see, e.g., FIG. 6C). Skinless front-half 30 of a chicken carcass is positioned for cutting a V-shaped cut 40 (see, e.g., FIGS. 5A-6C) to produce a poultry meat product 80 (see, e.g., FIGS. 5A-6C). Producing poultry meat product 80 involves separating and removing wishbone or furcula 10 along with a specified or desired amount of adhering or attached muscle or meat 84, e.g., 1-5 oz., more preferably 2-4 oz, most preferably 3 oz, or other amounts of attached meat 84. The portion of attached meat 84 remains attached to wishbone 10 and is removed from a skinless breast muscle 25 of poultry carcasses. Consequently, for a typical chicken, wishbone breast strip poultry meat product 80 of the invention will preferably constitute from 10% to 25% of the available meat of breast meat 25, more preferably 15% to 20% of the available breast meat fillets 60, and most preferably about 17% of the available breast meat fillets 60. For a small bird, e.g., a 1-2 lb. Cornish game hen, the breast strip meat poultry product 80 of the invention will contain between 10% and 100% of the available breast meat fillets 60. The preferred ratio of meat of poultry meat product 80 to breast meat fillets 60 will tend to be smaller for larger birds having more breast meat 25 relative to size of wishbone 10. In FIG. 3, poultry carcass is designated generally 20. An example cut line is illustrated with dotted line 40.

The resulting meat product is a wishbone breast strip meat product 80 having attached breast muscle 84 adhered to wishbone 82 (i.e., outer breast muscles or fillet), thus creating a high ratio of attached meat 84 to bone, i.e., of wishbone 10.

Figure 4:
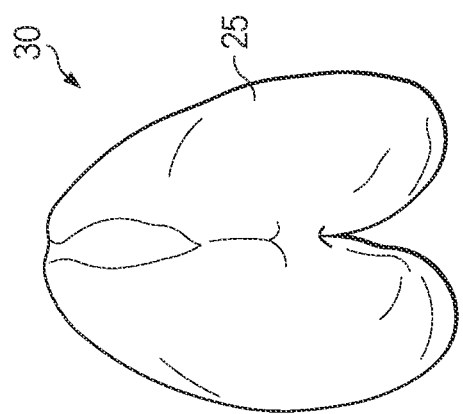
FIG. 4 is a plan view of a skinless front-half of a chicken carcass having breast fillets, the chicken carcass having the leg quarters and wings removed.
Figure 6B:
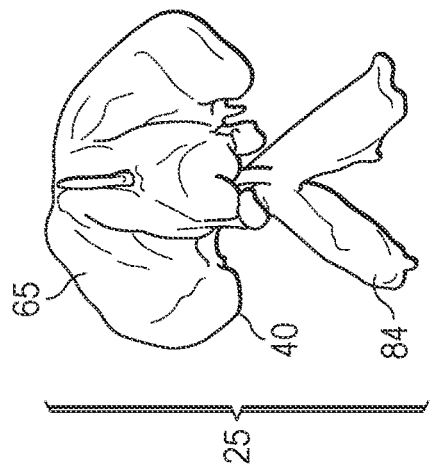
FIG. 6B is a plan view of the chicken carcass of FIG. 4 that shows a poultry meat product or wishbone breast strip, breast fillets and tenders.
Figure 6A:
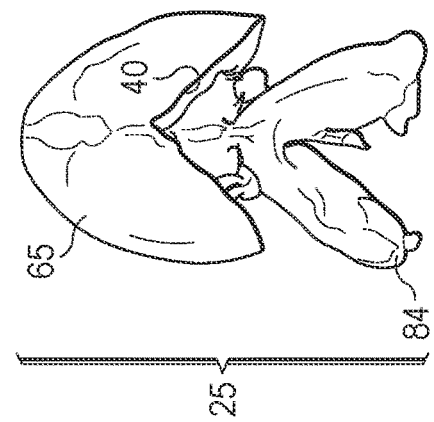
FIG. 6A is a plan view of the chicken carcass of FIG. 4 that shows a portion of the breast fillets, i.e., a poultry meat product or wishbone breast strip, being separated from the breast fillets.

The method of cutting a whole poultry carcass or front halves 30 to create a wishbone breast meat poultry product 80 of the invention involves the steps of:

a. Use of skinless front-halves 30 of chicken carcasses with the leg quarters and wings removed at the shoulder joint to "loosen" the attachments, as shown in FIG. 4.

b. Making v-shaped cut 40 for cutting fillets 60 at the proximal end of breast fillets 60 of front half 30 parallel to legs of wishbone 10 on both sides, as shown in FIGS. 5A-5C. The angle of cut 40 may vary depending on the weight of the carcass, straight down but never deep enough to damage the underlying tenders 70.

c. Separating wishbone 10 with desired amount of attached meat 84, i.e., separating the wishbone breast poultry product 80 and removing separated breast fillet portion 60 and tenders 70 intact, as shown in FIGS. 6A-6C.

The present invention is a new and novel approach of preparing a wishbone breast strip poultry product 80 with attached breast meat portion 84 and a portion of remaining poultry breast meat 65, as it will provide maximum salable breast yields including a premium wishbone breast strip poultry product 80.

The method contemplates limiting an amount of attached breast muscle 84 removed from the fillets 60, thus allowing for the further utilization of the remaining breast meat fillets 65 for conventional cuts.

As indicated earlier, bone-in products may pose a physical food safety hazard from bone fragments and, therefore, intact wishbones 10 are preferred. This can be assured by a number of methods, including x-ray imaging.

The wishbone breast strip meat poultry product 80 of the invention can be prepared for consumption following marinating, either by grilling or by deep-fat frying.

Wishbone Strip Cutter

Wishbone breast strip poultry product 80 may be manufactured on an automatic deboning line equipped with wishbone strip cutters. In automatic deboning lines, the poultry front-halves 30 or caps, i.e., back frame removed, are typically secured with breast fillet muscles 60 facing up on carriers either on a straight conveyor track or on a round carousel line in preparation for harvesting attached breast fillet meat 25.

Figure 8:
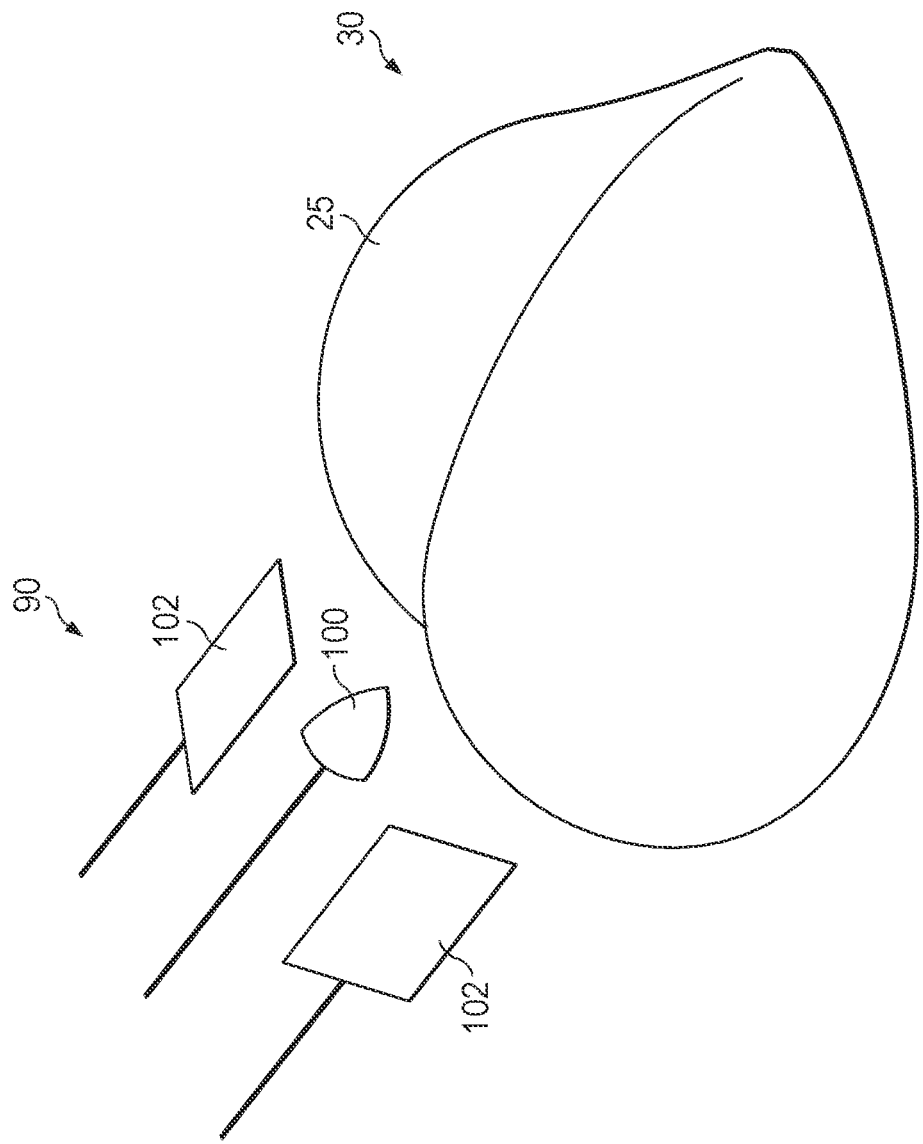
FIG. 8 is a schematic perspective view of a V-shaped wishbone strip cutter adjacent a poultry carcass.
Figure 9:
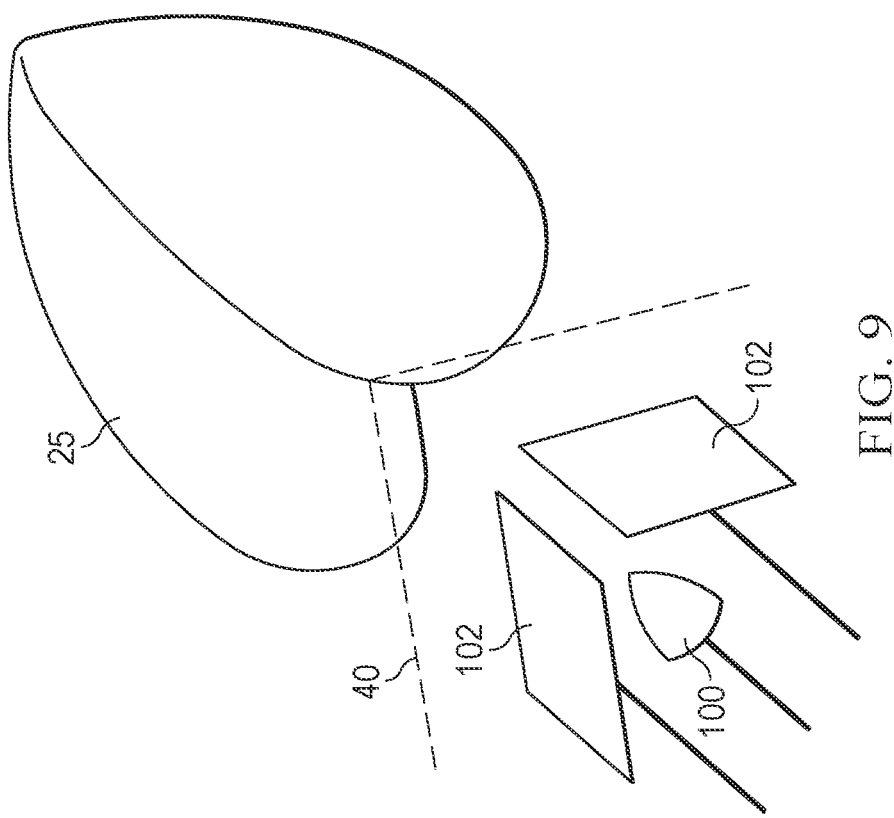
FIG. 9 is a schematic perspective view of the V-shaped wishbone strip cutter of FIG. 8 adjacent a poultry carcass showing a v-shaped cut on the poultry carcass.

In one embodiment, wishbone strip cutter 90 includes a module with multiple knives making different cuts. In one embodiment wishbone strip cutter 90 includes first knife 100 that enters from a neck opening and detaches wishbone 10 from keel 12 by severing an attachment ligament (FIG. 8). Simultaneously, two straight/curved shoulder-cut blades 102, positioned on opposite sides of first knife 100 independently cut shoulder attachments.

Once wishbone 10 is freed from its attachments, V-shaped breast fillet cut 40 will proceed along a line parallel to the legs of wishbone 10 on both sides and towards keel 12. The angle of blades 102 may be adjusted to allow a desired amount of attached meat 84 to remain attached to wishbone 10, based on the average weight of the carcass or on economic factors. Wishbone 10 with attached breast meat 84 are then removed with withdrawal stroke of blades 100, 102.

Figure 10:
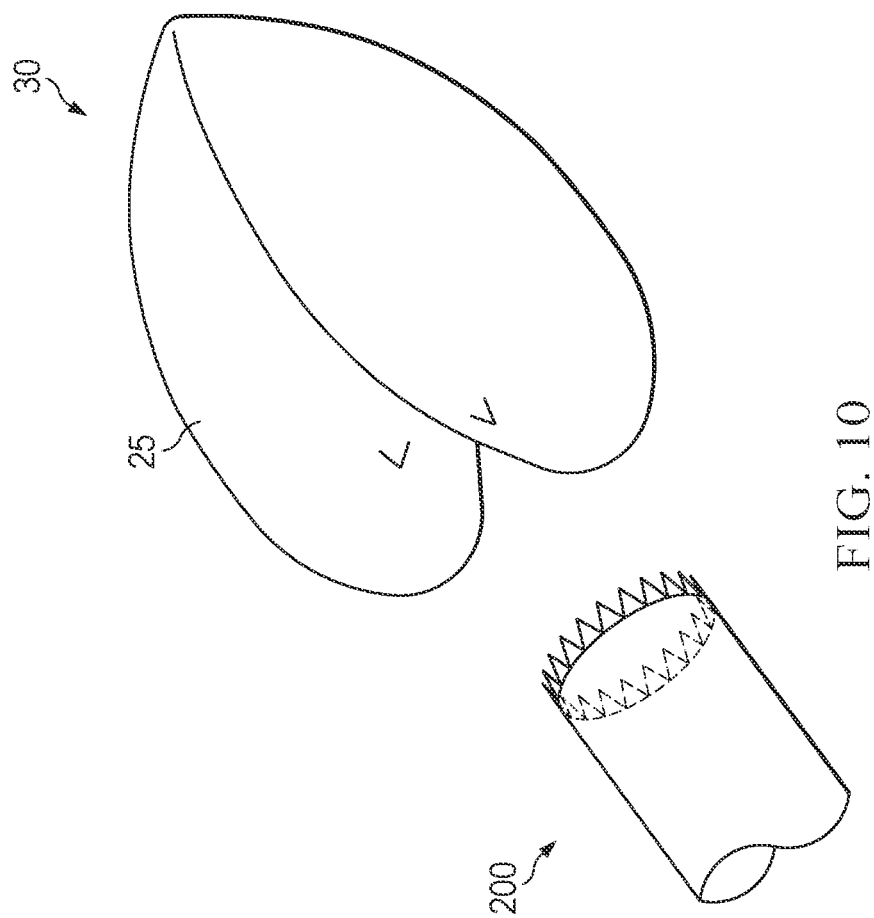
FIG. 10 is a schematic perspective view of a round-cut cutter for making a cylindrical cut for removing the wishbone and a portion of the breast fillets.

Referring now to FIG. 10, in one embodiment, a module houses round cutting tool 200. Round cutting tool 200 is inserted into poultry carcass 30 to cut a tendon that holds the upper legs of wishbone 10, tissue/cartilage holding the "V" of wishbone 10 and a desired diameter of attached meat 84 into which wishbone 10 is imbedded. A distance from a top tendon holding each leg of wishbone 10 to the bottom tissue holding the "V" will change with bird size.

In a preferred embodiment, the amount of attached meat 84 retained with wishbone 10 as opposed to separated or remaining meat 65 that remains with poultry carcass 30 falls within the following parameters.

Poultry meat product 80 of the invention may be removed from poultry carcass 30 having breast meat 25, the breast meat 25 defining a first or attached portion 84 engaging wishbone 10 and a second or remaining portion 65 that are separated from one another, wherein said first portion 84 comprises between 3% and 50%, more particularly 5% to 40%, more particularly 10% to 30%, more particularly 15% to 25% by weight of the breast meat 25.

Figure 7:
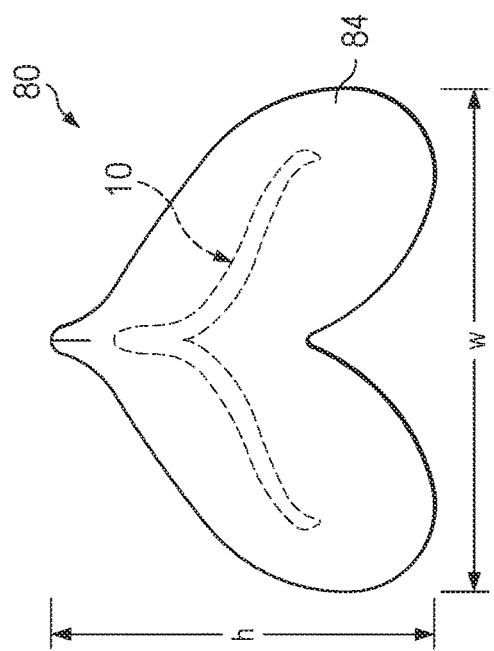
FIG. 7 is a schematic plan view showing an example poultry meat product, i.e., a wishbone breast strip, wherein the wishbone is shown in dashed lines.
Figure 11:
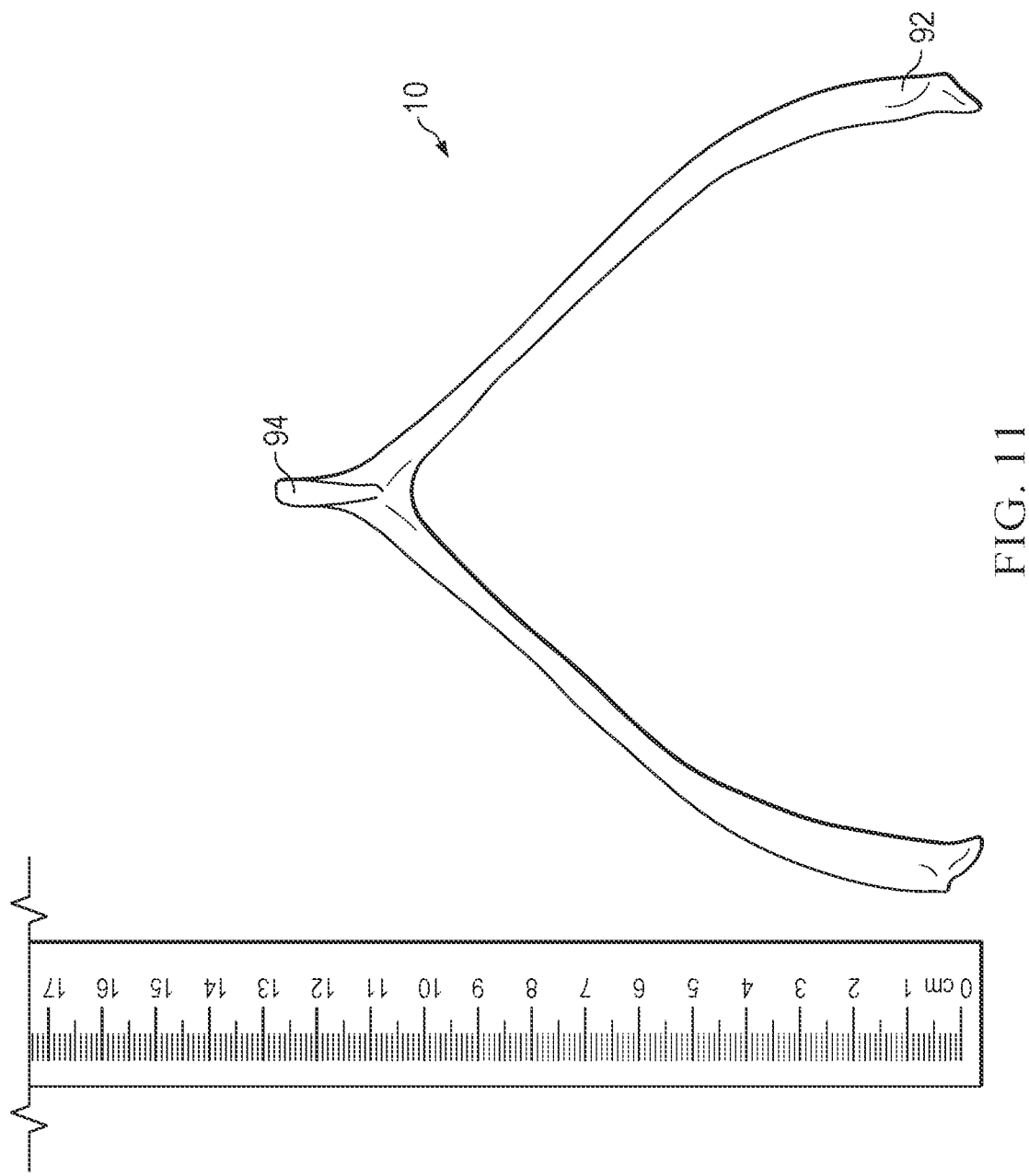
FIG. 11 is an example relatively larger wishbone shown adjacent a ruler.

Poultry meat product 80 may be removed from a poultry carcass 30 having breast meat 25 and wishbone 10, the breast meat 25 defining a first or attached portion 84 engaging wishbone 10 and a second or remaining portion 65 that are separated from one another, wherein wishbone 10 has a split end defining tips 92 and a joined end 94 (see, e.g., FIG. 11). Tips 92 are spaced a first distance apart, wherein first portion 84 of breast meat 25 has a width and a length, the width having a dimension of between 0.5 and 1.5 times said first distance between wishbone tips 92, more particularly between 1 and 1.5 times, and more particularly between 0.5 and 1.5 times (see, e.g., FIG. 7).

Poultry meat product 80 may be removed from poultry carcass 30 having breast meat 25 and wishbone 10, breast meat 25 defining first portion 84 engaging wishbone 10 and second portion 65 that are separated from one another, wherein wishbone 10 has a split end defining tips 92 and a joined end 94, wherein tips 92 are spaced a first distance apart. In one embodiment, first portion 84 of breast meat 25 has a width and a length, wherein the length has a dimension of between 0.75 and 1.25 times a length of wishbone 10 from said tips 92 to said joined end 94, more particularly between 0.9 and 1.1 times a length of wishbone 10 from said tips 92 to said joined end 94. Other dimensions are also possible.

Poultry meat product 80 may be removed from poultry carcass 30 having breast meat 25 and wishbone 10, breast meat 25 defining first portion 84 engaging wishbone 10 and second portion 65 that are separated from one another, wherein wishbone 10 has a split end defining tips 92 and a joined end 94. In one embodiment, poultry meat product 80 comprises 5% to 90% bone and 10% to 95% meat and have a height h (FIG. 7) from 4 centimeters to 16.20 centimeters, and a width w (FIG. 7) from 4 centimeters to 26 centimeters. Other dimensions are also possible.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of producing a poultry meat product comprising the steps of:
    positioning a skinless front-half of a bird carcass, said bird carcass defining a proximal end and having a pair of breast fillets, a pair of tenders, and a wishbone, said wishbone having a first leg and a second leg, said bird carcass having leg quarters and wings removed at the shoulder joint to loosen attachments;
    inserting a shaped blade into said bird carcass for making a shaped cut said shaped cut defining an attached portion of said breast fillets that remain attached to said wishbone, wherein said wishbone remains intact;
    separating said wishbone with said attached portion of said breast fillets for preparing a wishbone breast strip.

2. The method of claim 1 wherein said shaped blade is a V-shaped blade for making a V-shaped cut for cutting said breast fillets at said proximal end of said bird carcass, said V-shaped cut having a first segment approximately parallel to said first leg of said wishbone and a second segment approximately parallel to said second leg of said wishbone.

3. The method of claim 1 wherein said shaped blade is a cylindrical blade for making a cylindrical cut.

4. The method of claim 1 wherein said attached portion of said breast fillets comprises between 5% and 40% by weight of said pair of breast fillets.

5. The method of claim 1 wherein said attached portion of said breast fillets comprises between 10% and 30% by weight of said pair of breast fillets.

6. The method of claim 1 wherein said attached portion of said breast fillets comprises between 15% and 25% by weight of said pair of breast fillets.

7. The method of claim 1 wherein said wishbone has a split end defining tips and a joined end, said tips spaced a first distance apart, said attached portion of said breast fillets having a width having a dimension of between 1.0 and 1.5 times said first distance between said wishbone tips.

8. The method of claim 7 wherein:
    said width of said attached portion of said breast fillets has a dimension of between 1 and 1.25 times said first distance between said wishbone tips.

9. The method of claim 1 wherein:
    said wishbone has a split end defining tips and a joined end, said wishbone having a length defined by a distance between said joined end and a mid-point between said tips of said wishbone; and
    a length of said attached portion of said breast fillets has a dimension of between 0.5 and 1.5 times said length of said wishbone.

10. The method of claim 1 wherein:
    said wishbone has a split end defining tips and a joined end, said wishbone having a length defined by a distance between said joined end and a mid-point between said tips of said wishbone; and
    a length of said attached portion of said breast fillets has a dimension of between 0.75 and 1.25 times said length of said wishbone.

11. The method of claim 1 wherein:
said wishbone has a split end defining tips and a joined end, said wishbone having a length defined by a distance between said joined end and a mid-point between said tips of said wishbone; and
a length of said attached portion of said breast fillets has a dimension of between 0.9 and 1.1 times said length of said wishbone.

12. A poultry meat product produced from a poultry carcass having breast meat divisible into a first portion attached to a wishbone and a second portion separated from the wishbone, the poultry meat product comprising:
the first portion of the breast meat separated from the second portion of the breast meat;
wherein the wishbone that is attached to said first portion of said breast meat remains intact; and
wherein said first portion of said breast meat comprises between 3% and 50% by weight of said breast meat.

13. The poultry product according to claim 12 wherein:
said first portion of said breast meat is between 5% and 40% by weight of said breast meat.

14. The poultry product according to claim 12 wherein:
said first portion of said breast meat is between 10% and 30% by weight of said breast meat.

15. The poultry product according to claim 12 wherein:
said first portion of said breast meat is between 15% and 25% by weight of said breast meat.

16. A poultry meat product derived from a poultry carcass having breast meat and a wishbone, wherein the wishbone has a split end defining tips and a joined end, the tips spaced a first distance apart, and a distance between the joined end and a mid-point between the tips defining a length, the poultry meat product comprising:
a first portion of the breast meat separated from a second portion of said breast meat, wherein said first portion remains attached to the wishbone;
wherein said first portion of said breast meat has a width and a length, said width having a dimension of between 1.0 and 1.5 times the first distance between the wishbone tips.

17. The poultry meat product according to claim 16 wherein:
said width of said breast meat has a dimension of between 1 and 1.25 times said first distance between said wishbone tips.

18. The poultry meat product according to claim 16 wherein:
said length of said first portion of said breast meat has a dimension of between 0.5 and 1.5 times the length of said wishbone.

19. The poultry meat product according to claim 16 wherein:
said length of said first portion of said breast meat has a dimension of between 0.75 and 1.25 times the length of said wishbone.

20. The poultry meat product according to claim 16 wherein:
said length of said first portion of said breast meat has a dimension of between 0.9 and 1.1 times the length of said wishbone.

21. The method of claim 16 wherein said first portion of said breast meat comprises between 5% and 40% by weight of said breast meat.

22. The method of claim 16 wherein said first portion of said breast meat comprises between 10% and 30% by weight of said breast meat.

\* \* \* \* \*